US008950486B2

(12) United States Patent
Benkley et al.

(10) Patent No.: US 8,950,486 B2
(45) Date of Patent: *Feb. 10, 2015

(54) ACID-SOLUBLE CEMENT COMPOSITIONS COMPRISING CEMENT KILN DUST AND METHODS OF USE

(75) Inventors: James Robert Benkley, Duncan, OK (US); D. Chad Brenneis, Marlow, OK (US); Craig W. Roddy, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 269 days.

This patent is subject to a terminal disclaimer.

(21) Appl. No.: 13/595,493

(22) Filed: Aug. 27, 2012

(65) Prior Publication Data

US 2012/0318506 A1 Dec. 20, 2012

Related U.S. Application Data

(60) Continuation-in-part of application No. 12/825,004, filed on Jun. 28, 2010, now Pat. No. 8,297,357, which is a continuation-in-part of application No. 12/606,381, filed on Oct. 27, 2009, now Pat. No. 7,743,828, which is a continuation-in-part of application No. 12/420,630, filed on Apr. 8, 2009, now Pat. No. 7,631,692, which is a continuation-in-part of application No. 12/349,676, filed on Jan. 7, 2009, now Pat. No. 7,674,332, which is a division of application No. 12/034,886, filed on Feb. 21, 2008, now Pat. No. 7,478,675, which is a continuation-in-part of application No. 11/223,669, filed on Sep. 9, 2005, now Pat. No. 7,445,669.

(51) Int. Cl.
| E21B 33/13 | (2006.01) |
| C09K 8/46 | (2006.01) |
| C04B 28/02 | (2006.01) |
| C04B 28/32 | (2006.01) |
| C09K 8/467 | (2006.01) |
| C09K 8/473 | (2006.01) |
| C04B 40/00 | (2006.01) |
| C04B 111/10 | (2006.01) |

(52) U.S. Cl.
CPC ............... C09K 8/46 (2013.01); C04B 28/021 (2013.01); C04B 28/32 (2013.01); C09K 8/467 (2013.01); C09K 8/473 (2013.01); C04B 28/02 (2013.01); C04B 40/0092 (2013.01); C04B 2111/1037 (2013.01)
USPC ........... 166/292; 106/685; 106/707; 106/709; 106/716; 507/269

(58) Field of Classification Search
None
See application file for complete search history.

(56) References Cited

U.S. PATENT DOCUMENTS

| 1,931,921 A | 10/1933 | Breerwood |
| 2,021,956 A | 11/1935 | Gladney et al. |
| 2,045,899 A | 6/1936 | Davis |
| 2,094,316 A | 9/1937 | Cross et al. |
| 2,133,622 A | 10/1938 | Larmour et al. |
| 2,144,254 A | 1/1939 | Breerwood |
| 2,193,775 A | 3/1940 | Stratford |
| 2,193,807 A | 3/1940 | Dieterich |
| 2,214,715 A | 9/1940 | Breerwood |
| 2,329,940 A | 9/1943 | Ponzer |
| 2,592,468 A | 4/1952 | Rex et al. |
| 2,772,739 A | 12/1956 | Arie |
| 2,842,205 A | 7/1958 | Allen et al. |
| 2,844,361 A | 7/1958 | Dilcher et al. |
| 2,848,051 A | 8/1958 | Willaims |
| 2,871,133 A | 1/1959 | Palonen et al. |
| 2,880,096 A | 3/1959 | Hurley |
| 2,945,769 A | 7/1960 | Gama et al. |
| 3,024,125 A | 3/1962 | Lee |
| 3,066,031 A | 11/1962 | Schifferle |
| 3,168,139 A | 2/1965 | Kennedy et al. |
| 3,320,077 A | 5/1967 | Prior |
| 3,411,580 A | 11/1968 | Roberts et al. |
| 3,421,703 A | 1/1969 | Galer |
| 3,454,095 A | 7/1969 | Messenger et al. |
| 3,467,193 A | 9/1969 | McColl et al. |
| 3,473,939 A | 10/1969 | Mayberry et al. |
| 3,499,491 A | 3/1970 | Wyant et al. |
| 3,557,876 A | 1/1971 | Tragesser |
| 3,574,113 A | 4/1971 | Shannon |

(Continued)

FOREIGN PATENT DOCUMENTS

| CA | 2064682 | 4/1992 |
| CA | 2336077 | 1/2000 |

(Continued)

OTHER PUBLICATIONS

Bartlet-Gouedard, "A Non-Conventional Way of Developing Cement Slurry for Geothermal Wells", 2001.
Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.
Smith, "Cementing"0 Society of Petroleum Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.

(Continued)

*Primary Examiner* — Angela M DiTrani
(74) *Attorney, Agent, or Firm* — Craig W. Roddy; Tumey L.L.P.

(57) ABSTRACT

The present invention relates to acid-soluble cement compositions that comprise cement kiln dust ("CKD") and associated methods of use. An embodiment provides a method of cementing comprising: providing an acid-soluble cement composition comprising a kiln dust and water; allowing the acid-soluble cement composition to set to form an acid-soluble hardened mass; and contacting the acid-soluble hardened mass with an acid.

31 Claims, No Drawings

(56) References Cited

U.S. PATENT DOCUMENTS

| | | |
|---|---|---|
| 3,574,816 A | 4/1971 | Abbdellatif et al. |
| 3,628,973 A | 12/1971 | Greening et al. |
| 3,748,159 A | 7/1973 | George |
| 3,749,173 A | 7/1973 | Hill et al. |
| 3,863,718 A | 2/1975 | Bruist |
| 3,876,005 A | 4/1975 | Fincher et al. |
| 3,887,009 A | 6/1975 | Miller et al. |
| 3,887,385 A | 6/1975 | Quist et al. |
| 3,921,717 A | 11/1975 | Danjushevsky |
| 3,959,007 A | 5/1976 | Pitt |
| 4,018,617 A | 4/1977 | Nicholson |
| 4,018,619 A | 4/1977 | Webster et al. |
| 4,031,184 A | 6/1977 | McCord |
| 4,036,301 A | 7/1977 | Powers et al. |
| 4,083,407 A | 4/1978 | Griffin et al. |
| 4,101,332 A | 7/1978 | Nicholson |
| 4,105,459 A | 8/1978 | Mehta |
| 4,141,843 A | 2/1979 | Watson |
| 4,160,674 A | 7/1979 | Sawyer |
| 4,176,720 A | 12/1979 | Wilson |
| 4,268,316 A | 5/1981 | Wills et al. |
| 4,274,881 A | 6/1981 | Langton |
| 4,304,300 A | 12/1981 | Watson |
| 4,333,764 A | 6/1982 | Richardson |
| 4,335,788 A | 6/1982 | Murphey et al. |
| 4,341,562 A | 7/1982 | Ahlbeck |
| RE31,190 E | 3/1983 | Detroit et al. |
| 4,400,474 A | 8/1983 | Copperthwaite et al. |
| 4,407,677 A | 10/1983 | Wills et al. |
| 4,423,781 A | 1/1984 | Thomas |
| 4,432,800 A | 2/1984 | Kneller et al. |
| 4,435,216 A | 3/1984 | Diehl et al. |
| 4,436,850 A | 3/1984 | Burdick et al. |
| 4,440,576 A | 4/1984 | Flannery et al. |
| 4,460,292 A | 7/1984 | Durham et al. |
| 4,462,835 A | 7/1984 | Car |
| 4,470,463 A | 9/1984 | Holland |
| 4,494,990 A | 1/1985 | Harris |
| 4,515,635 A | 5/1985 | Rao et al. |
| 4,519,452 A | 5/1985 | Tsao et al. |
| 4,555,269 A | 11/1985 | Rao et al. |
| 4,614,599 A | 9/1986 | Walker |
| 4,624,711 A | 11/1986 | Styron |
| 4,633,950 A | 1/1987 | Delhommer et al. |
| 4,676,317 A | 6/1987 | Fry et al. |
| 4,676,832 A | 6/1987 | Childs et al. |
| 4,741,782 A | 5/1988 | Styron |
| 4,784,223 A | 11/1988 | Worrall et al. |
| 4,829,107 A | 5/1989 | Kindt |
| 4,883,125 A | 11/1989 | Wilson et al. |
| 4,941,536 A | 7/1990 | Brothers et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,113,943 A | 5/1992 | Wilson et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,183,505 A | 2/1993 | Spinney |
| 5,183,506 A | 2/1993 | Zhang |
| 5,213,160 A | 5/1993 | Nahm et al. |
| 5,213,161 A | 5/1993 | King et al. |
| 5,215,585 A | 6/1993 | Luthra et al. |
| 5,220,960 A | 6/1993 | Totten et al. |
| 5,238,064 A | 8/1993 | Dahl et al. |
| 5,252,128 A | 10/1993 | Gopalkrishnan |
| 5,266,111 A | 11/1993 | Barbour |
| 5,281,270 A | 1/1994 | Totten et al. |
| 5,290,355 A | 3/1994 | Jakel et al. |
| 5,295,543 A | 3/1994 | Terry et al. |
| 5,298,069 A | 3/1994 | King et al. |
| 5,305,831 A | 4/1994 | Nahm |
| 5,314,022 A | 5/1994 | Cowan et al. |
| 5,316,083 A | 5/1994 | Nahm et al. |
| 5,327,968 A | 7/1994 | Onan et al. |
| 5,337,824 A | 8/1994 | Cowan |
| 5,339,902 A | 8/1994 | Harris |
| 5,346,548 A | 9/1994 | Mehta |
| 5,352,288 A | 10/1994 | Mallow |
| 5,358,044 A | 10/1994 | Hale et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,417,759 A | 5/1995 | Huddleston |
| 5,421,409 A | 6/1995 | Mueller et al. |
| 5,423,379 A | 6/1995 | Hale et al. |
| 5,430,235 A | 7/1995 | Hooykaas et al. |
| 5,439,056 A | 8/1995 | Cowan |
| 5,456,751 A | 10/1995 | Zandi et al. |
| 5,458,195 A | 10/1995 | Totten et al. |
| 5,464,060 A | 11/1995 | Hale et al. |
| 5,472,051 A | 12/1995 | Brothers |
| 5,476,144 A | 12/1995 | Nahm et al. |
| 5,478,391 A | 12/1995 | Babaev et al. |
| 5,484,019 A | 1/1996 | Griffith |
| 5,494,513 A | 2/1996 | Fu et al. |
| 5,499,677 A | 3/1996 | Cowan |
| 5,515,921 A | 5/1996 | Cowan et al. |
| 5,518,996 A | 5/1996 | Maroy et al. |
| 5,520,730 A | 5/1996 | Barbour |
| 5,529,123 A | 6/1996 | Carpenter et al. |
| 5,529,624 A | 6/1996 | Riegler |
| 5,536,311 A | 7/1996 | Rodrigues |
| 5,542,782 A | 8/1996 | Carter et al. |
| 5,554,352 A | 9/1996 | Jaques et al. |
| 5,569,324 A | 10/1996 | Totten et al. |
| 5,580,379 A | 12/1996 | Cowan |
| 5,585,333 A | 12/1996 | Dahl et al. |
| 5,588,489 A | 12/1996 | Chatterji et al. |
| 5,626,665 A * | 5/1997 | Barger et al. ............ 106/706 |
| 5,641,584 A | 6/1997 | Andersen et al. |
| 5,673,753 A | 10/1997 | Hale et al. |
| 5,681,384 A | 10/1997 | Liskowitz |
| 5,685,903 A | 11/1997 | Stav et al. |
| 5,688,844 A | 11/1997 | Chatterji et al. |
| 5,711,383 A | 1/1998 | Terry et al. |
| 5,716,910 A | 2/1998 | Totten et al. |
| 5,728,654 A | 3/1998 | Dobson et al. |
| 5,788,762 A * | 8/1998 | Barger et al. ............ 106/706 |
| 5,795,924 A | 8/1998 | Chatterji et al. |
| 5,820,670 A | 10/1998 | Chatterji et al. |
| 5,851,960 A | 12/1998 | Totten et al. |
| 5,866,516 A | 2/1999 | Costin |
| 5,866,517 A | 2/1999 | Carpenter et al. |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,098,711 A | 8/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |

(56) References Cited

U.S. PATENT DOCUMENTS

| | | |
|---|---|---|
| 6,258,757 B1 | 7/2001 | Sweatman et al. |
| 6,264,738 B1 | 7/2001 | Lorke et al. |
| 6,277,189 B1 | 8/2001 | Chugh |
| 6,312,515 B1 | 11/2001 | Barlet-Gouedard et al. |
| 6,315,042 B1 | 11/2001 | Griffith et al. |
| 6,328,106 B1 | 12/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,416,574 B1 | 7/2002 | Steelhammer |
| 6,451,104 B2 | 9/2002 | Mehta |
| 6,457,524 B1 | 10/2002 | Roddy |
| 6,478,869 B2 | 11/2002 | Reddy et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,502,634 B1 | 1/2003 | Evans et al. |
| 6,508,305 B1 | 1/2003 | Brannon et al. |
| 6,516,884 B1 | 2/2003 | Chatterji et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Reddy et al. |
| 6,626,243 B1 | 9/2003 | Go Boncan |
| 6,641,658 B1 | 11/2003 | Dubey |
| 6,645,289 B2 | 11/2003 | Sobolev |
| 6,645,290 B1 | 11/2003 | Barbour |
| 6,656,265 B1 | 12/2003 | Garnier et al. |
| 6,660,080 B2 | 12/2003 | Reddy et al. |
| 6,664,215 B1 | 12/2003 | Tomlinson |
| 6,666,268 B2 | 12/2003 | Griffith et al. |
| 6,668,927 B1 | 12/2003 | Chatterji et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,708,760 B1 | 3/2004 | Chatterji et al. |
| 6,715,568 B1 | 4/2004 | Bailey |
| 6,716,282 B2 | 4/2004 | Griffith et al. |
| 6,729,405 B2 | 5/2004 | DiLullo et al. |
| 6,749,679 B2 | 6/2004 | Shi |
| 6,755,905 B2 | 6/2004 | Oates |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,832,652 B1 | 12/2004 | Dillenbeck et al. |
| 6,835,243 B2 | 12/2004 | Brothers et al. |
| 6,837,316 B2 | 1/2005 | Reddy et al. |
| 6,840,318 B2 | 1/2005 | Lee |
| 6,846,357 B2 | 1/2005 | Reddy et al. |
| 6,848,519 B2 | 2/2005 | Reddy et al. |
| 6,869,474 B2 | 3/2005 | Perez-Pena et al. |
| 6,869,475 B1 | 3/2005 | Krowl |
| 6,874,578 B1 | 4/2005 | Garnier |
| 6,883,609 B2 | 4/2005 | Drochon |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,022,755 B1 | 4/2006 | Chatterji et al. |
| 7,044,222 B2 | 5/2006 | Tomlinson |
| 7,048,053 B2 | 5/2006 | Santra et al. |
| 7,077,203 B1 | 7/2006 | Roddy et al. |
| 7,096,944 B2 | 8/2006 | Vargo et al. |
| 7,101,829 B2 | 9/2006 | Guichard |
| 7,174,962 B1 | 2/2007 | Roddy et al. |
| 7,182,137 B2 | 2/2007 | Fyten et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,246,665 B2 | 7/2007 | Almond et al. |
| 7,284,609 B2 | 10/2007 | Roddy et al. |
| 7,285,164 B2 | 10/2007 | Luke et al. |
| 7,303,015 B2 | 12/2007 | Fyten et al. |
| 7,325,611 B2 | 2/2008 | Santra et al. |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,341,105 B2 | 3/2008 | Bingamon |
| 7,350,573 B2 | 4/2008 | Reddy |
| 7,350,575 B1 | 4/2008 | Lewis et al. |
| 7,350,576 B2 | 4/2008 | Robertson et al. |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,395,860 B2 | 7/2008 | Roddy et al. |
| 7,404,855 B2 | 7/2008 | Chatterji et al. |
| 7,409,990 B1 | 8/2008 | Burts et al. |
| 7,431,086 B2 | 10/2008 | Lewis et al. |
| 7,445,669 B2 | 11/2008 | Roddy et al. |
| 7,478,675 B2 | 1/2009 | Roddy et al. |
| 7,530,394 B2 | 5/2009 | Santra et al. |
| 7,544,641 B2 | 6/2009 | Robertson et al. |
| 7,607,482 B2 | 10/2009 | Roddy et al. |
| 7,607,484 B2 | 10/2009 | Roddy et al. |
| 7,627,870 B1 | 12/2009 | Michaeli et al. |
| 7,631,692 B2 | 12/2009 | Roddy et al. |
| 7,655,088 B2 | 2/2010 | Bethani |
| 7,674,332 B2 | 3/2010 | Roddy et al. |
| 7,741,841 B2 | 6/2010 | Edwards et al. |
| 7,743,828 B2 | 6/2010 | Roddy et al. |
| 7,784,542 B2 | 8/2010 | Roddy et al. |
| 7,789,150 B2 | 9/2010 | Roddy et al. |
| 7,815,880 B2 | 10/2010 | Constantz et al. |
| 7,867,954 B2 | 1/2011 | Warrender et al. |
| 7,887,694 B2 | 2/2011 | Constantz et al. |
| 7,919,064 B2 | 4/2011 | Kawatra et al. |
| 7,922,809 B1 | 4/2011 | Constantz et al. |
| 7,927,419 B2 | 4/2011 | Roddy |
| 8,006,446 B2 | 8/2011 | Constantz et al. |
| 8,029,618 B2 | 10/2011 | Al-Shafei |
| 8,039,253 B2 | 10/2011 | Asou |
| 8,062,999 B2 | 11/2011 | Reddy et al. |
| 8,143,198 B2 | 3/2012 | Lewis et al. |
| 8,261,827 B2 | 9/2012 | Roddy |
| 8,281,859 B2 | 10/2012 | Roddy |
| 8,297,357 B2 | 10/2012 | Brenneis |
| 8,307,899 B2 | 11/2012 | Brenneis |
| 8,318,642 B2 | 11/2012 | Roddy |
| 8,327,939 B2 | 12/2012 | Roddy |
| 8,333,240 B2 | 12/2012 | Roddy |
| 8,394,744 B2 | 3/2013 | Woytowich et al. |
| 8,399,387 B2 | 3/2013 | Roddy |
| 8,403,045 B2 | 3/2013 | Brenneis et al. |
| 8,434,553 B2 | 5/2013 | Brenneis |
| 8,440,596 B2 | 5/2013 | Brenneis |
| 8,486,868 B2 | 7/2013 | Brenneis et al. |
| 8,486,869 B2 | 7/2013 | Brenneis et al. |
| 8,505,629 B2 | 8/2013 | Benkley et al. |
| 8,505,630 B2 | 8/2013 | Chatterji et al. |
| 8,522,873 B2 | 9/2013 | Benkley et al. |
| 8,544,543 B2 | 10/2013 | Chatterji et al. |
| 8,551,923 B1 | 10/2013 | Benkley et al. |
| 8,554,543 B2 | 10/2013 | Cherepanov et al. |
| 8,555,967 B2 | 10/2013 | Chatterji et al. |
| 8,672,028 B2 | 3/2014 | Karcher et al. |
| 8,691,737 B2 | 4/2014 | Chatterji et al. |
| 2002/0033121 A1 | 3/2002 | Marko |
| 2002/0073897 A1 | 6/2002 | Trato |
| 2002/0117090 A1 | 8/2002 | Ku |
| 2003/0116065 A1 | 6/2003 | Griffith et al. |
| 2003/0116887 A1 | 6/2003 | Scott |

(56) References Cited

U.S. PATENT DOCUMENTS

| | | |
|---|---|---|
| 2003/0167970 A1 | 9/2003 | Polston |
| 2004/0007162 A1 | 1/2004 | Morioka et al. |
| 2004/0040475 A1 | 3/2004 | De La Roij et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0129181 A1 | 7/2004 | Lalande et al. |
| 2004/0182577 A1 | 9/2004 | Chatterji et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2004/0262000 A1 | 12/2004 | Morgan et al. |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0061505 A1 | 3/2005 | Caveny et al. |
| 2005/0072599 A1 | 4/2005 | Luke et al. |
| 2005/0077045 A1 | 4/2005 | Chatterji et al. |
| 2005/0084334 A1 | 4/2005 | Shi et al. |
| 2005/0098317 A1 | 5/2005 | Reddy et al. |
| 2005/0133221 A1 | 6/2005 | Chatterji et al. |
| 2005/0205255 A1 | 9/2005 | Gagliano et al. |
| 2006/0025312 A1 | 2/2006 | Santra et al. |
| 2006/0054319 A1 | 3/2006 | Fyten |
| 2006/0065399 A1 | 3/2006 | Luke et al. |
| 2006/0081372 A1 | 4/2006 | Dealy et al. |
| 2006/0086499 A1 | 4/2006 | Badalamenti et al. |
| 2006/0166834 A1 | 7/2006 | Roddy |
| 2006/0175060 A1 | 8/2006 | Reddy |
| 2006/0260512 A1 | 11/2006 | Nordmeyer |
| 2007/0056475 A1 | 3/2007 | Roddy et al. |
| 2007/0056479 A1 | 3/2007 | Gray |
| 2007/0089643 A1 | 4/2007 | Roddy et al. |
| 2007/0102157 A1 | 5/2007 | Roddy et al. |
| 2007/0137528 A1 | 6/2007 | Le Roy-Delage et al. |
| 2007/0186820 A1 | 8/2007 | O'Hearn |
| 2007/0289744 A1 | 12/2007 | Bingamon et al. |
| 2008/0092780 A1 | 4/2008 | Bingamon et al. |
| 2008/0156491 A1 | 7/2008 | Roddy et al. |
| 2008/0229979 A1 | 9/2008 | Lewis et al. |
| 2008/0236814 A1 | 10/2008 | Roddy |
| 2008/0300149 A1 | 12/2008 | Reddy et al. |
| 2009/0044726 A1 | 2/2009 | Brouillette et al. |
| 2009/0088348 A1 | 4/2009 | Roddy et al. |
| 2009/0105099 A1 | 4/2009 | Warrender et al. |
| 2009/0120644 A1 | 5/2009 | Roddy et al. |
| 2009/0124522 A1 | 5/2009 | Roddy et al. |
| 2009/0145601 A1 | 6/2009 | Bailey |
| 2009/0200029 A1 | 8/2009 | Roddy et al. |
| 2009/0266543 A1 | 10/2009 | Reddy et al. |
| 2009/0312445 A1 | 12/2009 | Roddy et al. |
| 2009/0320720 A1 | 12/2009 | Roddy et al. |
| 2010/0025039 A1 | 2/2010 | Roddy et al. |
| 2010/0041792 A1 | 2/2010 | Roddy et al. |
| 2010/0044043 A1 | 2/2010 | Roddy et al. |
| 2010/0044057 A1 | 2/2010 | Dealy et al. |
| 2010/0051266 A1 | 3/2010 | Roddy et al. |
| 2010/0051275 A1 | 3/2010 | Lewis et al. |
| 2010/0077922 A1 | 4/2010 | Constantz et al. |
| 2010/0081584 A1 | 4/2010 | Perez |
| 2010/0196104 A1 | 8/2010 | Constantz et al. |
| 2010/0258035 A1 | 10/2010 | Constantz et al. |
| 2010/0258312 A1 | 10/2010 | Brenneis et al. |
| 2010/0273912 A1 | 10/2010 | Roddy et al. |
| 2010/0282466 A1 | 11/2010 | Brenneis et al. |
| 2010/0292365 A1 | 11/2010 | Roddy et al. |
| 2010/0294496 A1 | 11/2010 | Woytowich et al. |
| 2010/0313793 A1 | 12/2010 | Constantz et al. |
| 2011/0000400 A1 | 1/2011 | Roddy |
| 2011/0017452 A1 | 1/2011 | Benkley |
| 2011/0100626 A1 | 5/2011 | Brenneis |
| 2011/0297378 A1 | 12/2011 | Reddy et al. |
| 2012/0145387 A1 | 6/2012 | Pyatina et al. |
| 2012/0145393 A1 | 6/2012 | Roddy |
| 2012/0152539 A1 | 6/2012 | Karcher |
| 2012/0227631 A1 | 9/2012 | Roddy |
| 2012/0234541 A1 | 9/2012 | Roddy |
| 2012/0267107 A1 | 10/2012 | Benkley et al. |
| 2012/0285682 A1 | 11/2012 | Santra et al. |
| 2012/0291674 A1 | 11/2012 | Brenneis et al. |
| 2012/0318506 A1 | 12/2012 | Benkley et al. |
| 2012/0325119 A1 | 12/2012 | Brenneis et al. |
| 2012/0325476 A1 | 12/2012 | Brenneis et al. |
| 2012/0325477 A1 | 12/2012 | Brenneis et al. |
| 2012/0328377 A1 | 12/2012 | Brenneis et al. |
| 2013/0008352 A1 | 1/2013 | Roddy et al. |
| 2013/0048286 A1 | 2/2013 | Morgan et al. |
| 2013/0061779 A1 | 3/2013 | Brenneis |
| 2013/0112405 A1 | 5/2013 | Benkley |
| 2013/0118752 A1 | 5/2013 | Hannegan et al. |
| 2013/0126159 A1 | 5/2013 | Bryan et al. |
| 2013/0153214 A1 | 6/2013 | Roddy et al. |
| 2013/0157903 A1 | 6/2013 | Benkley et al. |
| 2013/0213642 A1 | 8/2013 | Chatterji et al. |
| 2013/0213643 A1 | 8/2013 | Chatterji et al. |
| 2013/0233538 A1 | 9/2013 | Chatterjie et al. |
| 2013/0244911 A1 | 9/2013 | Benkley et al. |
| 2014/0048266 A1 | 2/2014 | Morgan et al. |
| 2014/0060389 A1 | 3/2014 | Chatterji et al. |
| 2014/0076204 A1 | 3/2014 | Brenneis et al. |
| 2014/0123879 A1 | 5/2014 | Karcher et al. |

FOREIGN PATENT DOCUMENTS

| | | |
|---|---|---|
| CA | 2153372 | 1/2006 |
| CN | 1054620 C | 11/1997 |
| CN | 97105829.X | 7/2000 |
| EP | 0814067 | 12/1997 |
| EP | 1092693 | 4/2001 |
| EP | 1236701 | 9/2002 |
| EP | 1319638 A1 | 6/2003 |
| EP | 1394137 | 7/2003 |
| EP | 1348831 | 10/2003 |
| EP | 1900703 | 3/2008 |
| EP | 2075303 | 7/2009 |
| GB | 1469954 | 4/1997 |
| GB | 2455446 | 6/2009 |
| JP | 52117316 | 10/1977 |
| JP | 10110487 | 4/1998 |
| RU | 2026959 | 1/1995 |
| RU | 2003136028 | 5/2005 |
| SU | 1373781 | 2/1988 |
| WO | WO 83/01443 | 4/1983 |
| WO | 93/21122 | 10/1993 |
| WO | 97/21637 | 6/1997 |
| WO | WO 98/54108 | 12/1998 |
| WO | WO 00/63134 | 1/2000 |
| WO | WO 03/031364 | 4/2003 |
| WO | WO 2004/101951 | 11/2004 |
| WO | WO 2004/101952 | 11/2004 |
| WO | WO 2005/047212 | 5/2005 |
| WO | WO 2005/061846 | 7/2005 |
| WO | WO 2006/032841 | 3/2006 |
| WO | 2006/074946 | 7/2006 |
| WO | WO 2007/028952 | 3/2007 |
| WO | 2007/041841 | 4/2007 |
| WO | WO 2007/048999 | 5/2007 |
| WO | WO 2007/128945 | 11/2007 |

(56) References Cited

FOREIGN PATENT DOCUMENTS

| WO | 2009/071962 | 6/2009 |
|---|---|---|
| WO | WO 2009/138747 | 11/2009 |
| WO | 2010086592 | 8/2010 |
| WO | 2011051664 | 5/2011 |
| WO | 2012/001343 | 1/2012 |

OTHER PUBLICATIONS

Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naigian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art, Petroleum Engineer International"Apr. 1978.
Sugama, "Carbonation of Hydrothermally Treated Phosphate-Bonded Calcium Aluminate Cements", pp. 1-9 (undated).
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", 1999.
HES Brochure "HR-4 Cement Retarder", 1999.
HES Brochure "HR-5 Cement Additive", 1998.
HES Brochure "HR-7 Cement Retarder", 1999.
HES Brochure "Pozmix A Cement Additive", 1999.
HES Brochure "Pozmix Cement and Pozmix 140" (undated).
HES Brochure "SCR-100 Cement Retarder a Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
Lafarge brochure "TerraCem™", Aug. 2006.
Lafarge MSDS "Cement Kiln Dust", Mar. 3, 2005.
Lafarge MSDS "LaFarge Blended Cement (cement)", Mar. 3, 1995.
TXI Material Safety Data Sheet for Pressur-Seal, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-973, 2005.
Answer 13 of 24 Chemical Abstracts on STN "Manufacture of ceramic particles from floatstone and fly ash", CN 1182062 (abstract only) (undated).
Answer 3 of 24 Chemical Abstracts on STN "Effect of cement kiln dust substitution on chemical and physical properties and compressive strength of Portland and slag cements", Adb El-aleem et al. (abstract only), 2005.
Adaska and Taubert, "Beneficial Uses of Cement Kiln Dust", 2008 IEEE/PCA 50$^{th}$ Cement Industry Technical Conference, Miami, FL, May 19-22, 2008, pp. 1-19.
Nelson, "Well Cementing", 1990.
"Fly Ash Resource Center-Pozzolan," available at http://www.rmajko.com/pozzolan.htm, Apr. 20, 2009.
Suyan, "An Innovative Material for Severe Lost Circulation Control in Depleted Formations", SPE/IADC, 125693, Oct. 2009.
HES Brochure, "Thermatek® RSP Rapid Set Plug Service", Mar. 2008.
HES Brochure, "Thermatek® Service", May 2005.
HES Brochure, "WG-17™ EXP, Free-Water Control Agent", 2008.
HES Brochure "Enhancer 923™ Cement Agent", 2010.
HES Brochure "Enhancer 923™ Agent—Successes from the Field", 2010.
HES Brochure "Halad® —447LM Fluid Loss Additive", Jul. 2012.
Vinson, "Acid Removable Cement System Helps Lost Circulation in Production Zones", IADC/SPE 23929, Feb. 1992.
Office Action from U.S. Appl. No. 11/223,671, Dec. 15, 2005
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May. 29, 2007.
Office Action from U.S. Appl. No. 11/223,669, Jun. 18, 2007.
Office Action from U.S. Appl. No. 11/257,261, Aug. 10, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/402,741, Oct. 24, 2007.
Office Action from U.S. Appl. No. 11/223,669, Jan. 29, 2008.
Office Action from U.S. Appl. No. 11/223,669, Apr. 8, 2008.
Office Action from U.S. Appl. No. 12/263,800, May 1, 2009.
Office Action from U.S. Appl. No. 12/283,398, Jul. 15, 2009.
Office Action from U.S. Appl. No. 12/263,800. Jul. 28, 2009.
Office Action from U.S. Appl. No. 12/420,630, Aug. 3, 2009.
Office Action from U.S. Appl. No. 12/349,676, Nov. 4, 2009.
Office Action from U.S. Appl. No. 12/606,381, Mar. 23, 2010.
Office Action from U.S. Appl. No. 12/609,993, Apr. 9, 2010.
Office Action from U.S. Appl. No. 12/609,993, Jun. 15, 2010.
Office Action from U.S. Appl. No. 12/558,097, Jun. 30, 2010.
Notice of Allowance from U.S. Appl. No. 12/609,993, Jul. 26, 2010.
Office Action from U.S. Appl. No. 12/558,097, Sep. 3, 2010.
Office Action from U.S. Appl. No. 12/821,412, Jun. 5, 2010.
Office Action from U.S. Appl. No. 12/844,612, Oct. 1, 2010.
Office Action from U.S. Appl. No. 12/544,915, Aug. 1, 2011.
Office Action from U.S. Appl. No. 12/844,612, Sep. 6, 2011.
Office Action from U.S. Appl. No. 12/264,010, Oct. 31, 2011.
Office Action from U.S. Appl. No. 12/844,612, Dec. 23, 2011.
Final Office Action from U.S. Appl. No. 12/264,010, Apr. 10, 2012.
Office Action from U.S. Appl. No. 12/844,612, Apr. 11, 2012.
Office Action from U.S. Appl. No. 13/399,913, May 15, 2012.
Office Action from U.S. Appl. No. 13/447,560, May 31, 2012.
Office Action from U.S. Appl. No. 12/821,412, Jun. 5, 2012.

(56) References Cited

OTHER PUBLICATIONS

Office Action from U.S. Appl. No. 12/825,004, Jun. 14, 2012.
Notice of Allowance from U.S. Appl. No. 13/447,560. Jun. 21, 2012.
Office action from U.S. Appl. No. 13/479,476, Jul. 2, 2012.
Office action from U.S. Appl. No. 12/975,196, Jul. 3, 2012.
Final Office Action from U.S. Appl. No. 12/844,612, Jul. 30, 2012.
Foreign Search Report from PCT/GB2005/001415, Sep. 9, 2005.
Foreign Search Report from PCT/GB2006/000406, Jul. 5, 2006.
Foreign Search Report from PCT/GB2006/003163, Oct. 27, 2006.
Foreign Search Report from PCT/GB2006/003160, Nov. 2, 2006.
Foreign Search Report from PCT/GB2006/003735, Dec. 1, 2006.
Foreign Search Report from PCT/GB2006/003694, Dec. 19, 2006.
Foreign Search Report from PCT/GB2006/000401, May 8, 2007.
Foreign Search Report from PCT/GB2009/000295, Feb. 3, 2009.
Foreign Search Report from PCT/GB2009/000295, Jul. 30, 2009.
EPO Application No. 06794648.3 Examination Report, Apr. 17, 2009.
EPO Application No. 06779194.7 Examination Report, May 29, 2009.
PCT International Search Report and Written Opinion for International Application No. PCT/GB2009/000295, Jul. 30, 2009.
PCT International Search Report and Written Opinion for International Application No. PCT/GB2009/002598, Feb. 11, 2010.
PCT International Search Report and Written Opinion for International Application No. PCT/GB2009/000295, Aug. 24, 2010.
PCT International Search Report and Written Opinion for International Application No. PCT/GB2010/001986, Jan. 19, 2011.
PCT International Search Report and Written Opinion for International Application No. PCT/GB2010/002011, Feb. 4, 2011.
PCT International Search Report and Written Opinion for International Application No. PCT/GB2009/002018, Mar. 24, 2011.
PCT International Search Report and Written Opinion for International Application No. PCT/GB2011/000933, Sep. 22, 2011.
PCT International Search Report and Written Opinion for International Application No. PCT/GB2011/001411, Jan. 27, 2012.
English language translation of USSR Patent No. RU 2026959, Jan. 20, 1995.
English language translation of Foreign Office Action for Application No. RU2008113765, Jul. 6, 2009.
English language translation of Chinese Application No. 200680042014.3, Dec. 1, 2010.
Foreign Office Action for Canadian Patent Application No. 2621835, Oct. 2, 2009.
Foreign Office Action for Canadian Patent Application No. 2621832, Oct. 5, 2009.
Foreign Office Action for Canadian Patent Application No. 2650630, Oct. 14, 2010.
Foreign Office Action for Canadian Patent Application No. 2658155, Nov. 16, 2010.
Foreign Office Action for Canadian Patent Application No. 2736148, May 29, 2012.
Foreign Office Action for CN Patent Application No. 200680042004.X, May. 12, 2010.
Foreign Office Action for EP Application No. 06 779 199.6, Mar. 1, 2010.
Foreign Office Action for EP Application No. 06 779 191.3, Mar. 31, 2010.
Foreign Office Action for EP Application No. 06 779 194.7, Jul. 2, 2010.
Foreign Office Action for EP Application No. 06 794 646.7, Sep. 24, 2010.
Foreign Office Action for EP Application No. 09 713 469.6, Sep. 28, 2010.
Foreign Office Action for RU Application No. 2008113766, Jul. 14, 2009.
Foreign Office Action for RU Application No. 2008113766, Apr. 8, 2010.
Final Office Action from U.S. Appl. No. 13/477,777 dated May 29, 2013.
Office Action from U.S. Appl. No. 13/620,013 dated May 28, 2013.
Notice of Allowance from U.S. Appl. No. 13/560,406 dated May 29, 2013.
Notice of Allowance from U.S. Appl. No. 12/895,436 dated May 28, 2013.
Notice of Allowance from U.S. Appl. No. 13/535,145 dated May 24, 2013.
Office Action from U.S. Appl. No. 13/851,925 dated Jun. 6, 2013.
Office Action from U.S. Appl. No. 13/851,391 dated Jul. 3, 2013.
Office Action from U.S. Appl. No. 13/889,398 dated Jun. 20, 2013.
Office Action from U.S. Appl. No. 13/872,063 dated Jul. 12, 2013.
Office Action from U.S. Appl. No. 13/767,710 dated Jul. 19, 2013.
Notice of Allowance from U.S. Appl. No. 13/851,391 dated Jul. 31, 2013.
Notice of Allowance from U.S. Appl. No. 13/889,398 dated Aug. 20, 2013.
Office Action from U.S. Appl. No. 13/725,833 dated Apr. 10, 2013.
Notice of Allowance from U.S. Appl. No. 13/669,149 dated May 13, 2013.
Notice of Allowance from U.S. Appl. No. 13/399,913 dated Aug. 23, 2012.
Notice of Allowance from U.S. Appl. No. 13/535,258 dated Sep. 7, 2012.
Notice of Allowance from U.S. Appl. No. 12/825,004 dated Sep. 20, 2012.
Office Action from U.S. Appl. No. 13/477,777 dated Oct. 15, 2012.
Notice of Allowance from U.S. Appl. No. 12/844,612 dated Oct. 18, 2012.
Final Office Action from U.S. Appl. No. 12/975,196 dated Oct. 23, 2012.
Office Action from U.S. Appl. No. 13/555,624 dated Oct. 19, 2012.
U.S. Appl. No. 13/622,821, filed Sep. 19, 2012.
U.S. Appl. No. 13/620,163, filed Sep. 14, 2012.
U.S. Appl. No. 13/620,013, filed Sep. 14, 2012.
U.S. Appl. No. 13/662,111, filed Oct. 26, 2012.
U.S. Appl. No. 13/669,149, filed Nov. 5, 2012.
Notice of Allowance for U.S. Appl. No. 13/662,111 dated Oct. 21, 2013.
Office Action for U.S. Appl. No. 13/620,013 dated Oct. 2, 2013.
Office Action for U.S. Appl. No. 13/851,925 dated Sep. 20, 2013.
Office Action for U.S. Appl. No. 13/180,238 dated Sep. 25, 2013.
Office Action for U.S. Appl. No. 13/767,710 dated Sep. 20, 2013.
Office Action for U.S. Appl. No. 13/477,777 dated Sep. 20, 2013.
International Search Report and Written Opinion for PCT/US2013/056719 dated Oct. 25, 2013.
International Search Report and Written Opinion of PCT/GB2011/000932 dated Sep. 22, 2011.
Office Action for U.S. Appl. No. 13/560,406 dated Oct. 17, 2012.
Office Action for U.S. Appl. No. 13/431,701 dated Nov. 9, 2012.
Office Action for U.S. Appl. No. 13/620,163 dated Nov. 9, 2012.
International Search Report and Written Opinion for International Application No. PCT/US2012/046117 dated Oct. 26, 2012.
Office Action for U.S. Appl. No. 13/669,149 dated Dec. 19, 2012.
Office Action for U.S. Appl. No. 13/606,098 dated Dec. 13, 2012.
HES Brochure "VersaCem™ Cement" dated Jan. 2007.
International Search Report for PCT/GB2011/001749 dated Apr. 5, 2012.
International Search Report and Written Opinion for PCT/GB2010/000712 dated Jul. 26, 2010.
Office Action for U.S. Appl. No. 13/620,013 dated Feb. 26, 2013.
International Search Report for PCT/US2013/048092 dated Nov. 13, 2013.
Office Action for U.S. Appl. No. 13/955,516 dated Dec. 19, 2013.
Notice of Allowance from U.S. Appl. No. 13/180,238 dated Jan. 22, 2014.
Notice of Allowance from U.S. Appl. No. 13/851,925 dated Jan. 24, 2014.

(56) References Cited

OTHER PUBLICATIONS

Office Action for U.S. Appl. No. 13/851,475 dated Jan. 24, 2014.
Office Action for U.S. Appl. No. 13/620,013 dated Jan. 30, 2014.
Office Action for U.S. Appl. No. 14/079,421 dated Jan. 30, 2014.
International Search Report for PCT/US2013/057213 dated Nov. 18, 2013.
Office Action for U.S. Appl. No. 13/595,493 dated Jul. 23, 2014.
The Professional standard of the People's Republic of China, Rotary Kiln Dust Added to Cement, ZB Q 12001-84, dated Oct. 25, 1994 and translation.
Chinese Reexamination of Application No. 200680042014.3 and Translation.
Chinese Application No. 200680042004.X dated Apr. 30, 2014 and Translation.
Toshinori Kojima et al., Reduction of CO2 Emission from Cement Manufacturing Process by Partly Substituting Silicate for Limestone, Greenhouse Gas Control Technologies, pp. 933-938, dated 1999.

* cited by examiner

ACID-SOLUBLE CEMENT COMPOSITIONS COMPRISING CEMENT KILN DUST AND METHODS OF USE

CROSS-REFERENCE TO RELATED APPLICATIONS

This application is a continuation-in-part of U.S. patent application Ser. No. 12/825,004, entitled "Acid-Soluble Cement Compositions Comprising Cement Kiln Dust and/or a Natural Pozzolan and Methods of Use," filed on Jun. 28, 2010, which is a continuation-in-part of U.S. patent application Ser. No. 12/606,381, issued as U.S. Pat. No. 7,743,828, entitled "Methods of Cementing Subterranean. Formation Formations Using Cement-Kiln Dust in Compositions Having Reduced Portland Cement Content" filed on Oct. 27, 2009, which is a continuation-in-part, of U.S. application Ser. No. 12/420,630, issued as U.S. Pat. No. 7,631,692, entitled "Settable Compositions Comprising a Natural Pozzolan and Associated Methods," filed on Apr. 8, 2009, which is a continuation-in-part of U.S. patent application Ser. No. 12/349, 676, issued as U.S. Pat. No. 7,674,332, entitled "Extended Sellable Compositions Comprising Cement Kiln Dust and Associated Methods," filed on Jan. 7, 2009, which is a divisional of U.S. patent application Ser. No. 12/034,886, issued as U.S. Pat. No. 7,478,675, entitled "Extended Settable Compositions Comprising Cement Kiln Dust and Associated Methods, filed on Feb. 21, 2008, which is a continuation-in-part of U.S. patent application Ser. No. 11/223,669, issued as U.S. Pat. No. 7,445,669, entitled "Settable Compositions Comprising Cement Kiln Dust and Additive(s)," filed Sep. 9, 2005, the entire disclosures of which are incorporated herein by reference.

BACKGROUND

The present invention relates to cementing operations and, more particularly, in certain embodiments, to acid-soluble cement compositions that comprise cement kiln dust ("CKD") and associated methods of use.

Cement compositions may be used in a variety of subterranean applications. For example, in subterranean well construction, a pipe string (e.g., easing, liners, expandable tubulars, etc.) may be run into a well bore and cemented in place. The process of cementing the pipe string in place is commonly referred to as "primary cementing." In a typical primary cementing method, a cement composition may be pumped, into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well, as protecting the pipe string from corrosion. Cement compositions also may be used in remedial cementing methods, for example, to seal cracks or holes in pipe strings or cement sheaths, to seal highly permeable formation zones or fractures, to place a cement plug, and the like. Cement compositions also may be used in surface applications, for example, construction cementing.

In some applications, it may be desirable for the cement composition to be acid soluble. For instance, an acid-soluble cement composition may be desirable in applications where it is anticipated that the hardened cement will be removed in subsequent well, bore operations. One particular application includes use of an acid-soluble cement composition to plug permeable zones in a formation that may allow the on desired flow of fluid into, or from, the well bore. For example, the permeable zones may result in the loss of circulation of fluids, such as a drilling fluid or a cement composition, in the well bore or an on desired influx of gas or water into the well bore. The permeable zones include, for example, vugs, voids, fractures (natural or otherwise produced) and the like. Other applications for acid-soluble cement compositions include, for example, the formation of annular plugs and isolation of gravel-packed well bore intervals. Examples of acid-soluble cement compositions include those comprising Sorel cements and Portland cements.

SUMMARY

The present invention relates to cementing operations and, more particularly, in certain embodiments, to acid-soluble cement compositions that comprise CKD and associated methods of use.

An embodiment of the present invention provides a method of cementing comprising: providing an acid-soluble cement composition comprising a kiln dust and water; allowing the acid-soluble cement composition to set to form an acid-soluble hardened mass; and contacting the acid-soluble hardened mass with an acid.

Another embodiment of the present invention provides a method cementing. The method of cementing may comprise placing an acid-soluble cement composition in a subterranean formation. The acid-soluble cement composition may comprise cement kiln dust in an amount of 100% by weight of a total amount of cementitious components in the acid-soluble cement composition and water. The method further may comprise allowing the acid-soluble cement composition to set to form an acid-soluble hardened mass. The method further may comprise contacting the acid-soluble hardened mass with an acid.

Another embodiment of the present invention provides a method of cementing. The method may comprise placing an acid-soluble cement composition in a subterranean formation. The acid-soluble cement composition may comprise cement kiln dust and water, wherein the acid-soluble cement composition is free of any acid-soluble fillers. The method further may comprise allowing the acid-soluble cement composition to set to form an acid-soluble hardened mass. The method further may comprise contacting the acid-soluble hardened mass with an acid.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, in certain embodiments, to acid-soluble cement compositions that comprise CKD and associated methods of use. There may be several potential advantages to the methods and compositions of the present invention, only some of which may be alluded to herein. One of the many potential advantages of embodiments of the present invention is that the inclusion of the CKD in the acid-soluble cement compositions should reduce the amount of, or potentially eliminate, a higher cost additive, such as Portland or Sorel cement, resulting in a more economical cement composition.

Another potential advantage of embodiments of the present invention is that reduction of the amount of Portland cement should reduce the carbon footprint of the acid-soluble cement compositions.

Embodiments of the acid-soluble cement compositions of the present invention, may comprise CKD. Additional embodiments of the acid-soluble cement compositions may comprise a hydraulic cement; a component selected from the group consisting of CKD, a natural pozzolan, and a combination thereof; and water. In an embodiment, the hydraulic cement may comprise Sorel cement. In another embodiment the cement compositions may further comprise an acid-soluble filler. In additional embodiments, the cement compositions may comprise CKD and be tree of any acid-soluble fillers. In yet another embodiment, the cement compositions may further comprise a source of calcium ions (e.g., hydrated lime). Other optional additives may also be included in embodiments of the cement compositions of the present invention as desired, including, but not limited to, fly ash, slag cement, metakaolin, shale, zeolite, combinations thereof, and the like. Additionally, embodiments of the cement compositions of the present invention may be foamed and/or extended as desired by those of ordinary skill in the art.

The acid-soluble cement compositions of the present invention should have a density suitable for a particular application as desired by those of ordinary skill in the art, with the benefit of this disclosure. In some embodiments, the cement compositions of the present invention may have a density in the range of from about 8 pounds per gallon ("ppg") to about 16 ppg. In other embodiments, the cement compositions may be foamed to a density in the range of from about 8 ppg to about 13 ppg.

Embodiments of the acid-soluble cement compositions of the present invention may comprise a hydraulic cement. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to Sorel cements, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, G, and H cements according to American Petroleum Institute, API Specification for Materials and Testing for Well Cements, API Specification 10, Fifth Ed., Jul. 1, 1990. In addition, in some embodiments, cements suitable for use in the present invention may be classified as ASTM Type I, II, or III As will be discussed in more detail below, acid-soluble fillers can be used with hydraulic cements (such as Portland cement) that do harden into an acid-soluble mass.

Where present, the hydraulic cement generally may be included in the acid-soluble cement compositions in an amount sufficient to provide the desired compressive strength, density, and/or cost. In accordance with embodiments, at least a portion of the hydraulic cement and potentially even all of the hydraulic cement may be replaced with CKD and/or a natural pozzolan. In an embodiment, at a least a portion of the hydraulic cement is replaced, with CKD and/or a natural pozzolan. In some embodiments, the hydraulic cement may be present in the cement compositions of the present invention in an amount in the range of 0% to about 99% by weight of cementitious components. As used herein, the term "by weight of cementitious components" refers to the concentration of the particular component by weight of a total amount of cementitious components included in the cement composition. Cementitious components include those components or combinations of components of the cement compositions that hydraulically set, or otherwise harden, to develop compressive strength, including, for example, Sorel cement Portland cement, CKD, fly ash, pumice, slag, lime, shale, and the like. For example, the cementitious components may comprise the hydraulic cement and any additional cementitious components that may be present in the acid-soluble cement composition. The hydraulic cement may be present, in certain embodiments, in an amount of about 5%, about 10%, about 15%, about 20%, about 25%, about 30%, about 35%, about 40%, about 45%, about 50%, about 55%, about 60%, about 65%, about 70%, about 75%, about 80%, about 90%, or about 95%. In an embodiment, the hydraulic cement may be present in an amount in the range of 0% to about 95% by weight of cementitious components, la another embodiment, the hydraulic cement may be present in an amount in the range of about 20% to about 95% by weight of cementitious components. In yet another embodiment, the hydraulic cement may be present m an amount in the range of about 50% to about 90% by weight of cementitious components. One of ordinary skill in the art, with the benefit of this disclosure, will recognize the appropriate amount of the hydraulic cement to include for a chosen application.

An example of a suitable hydraulic cement comprises a Sorel cement. Sorel cements typically include magnesia-based cement systems formed from a mixture of magnesium oxide and magnesium chloride. However, as used herein, the term "Sorel cement" is intended to encompass any of a variety of metal oxides and soluble salts which together form, a hydraulic cement. In the presence of water, the metal oxide and the soluble salt forming the Sorel cement should solidify into an acid-soluble mass. Embodiments of the Sorel cements should rapidly develop a desirable compressive strength. In accordance with, embodiments, at least a portion of the Sorel cement may be replaced with CKD and/or a natural pozzolan. In an embodiment, at a least a portion of the soluble salt is replaced with CKD and/or a natural pozzolan.

In an embodiment, the Sorel cement comprises a metal oxide. In one particular embodiment, the Sorel cement comprises an alkaline earth metal oxide, such as magnesium oxide. A suitable metal oxide is THERMATEK™ LT additive, available from Halliburton Energy Services, Inc. The metal oxide present in the Sorel cement should have an activity level sufficient to provide the desired reactivity. For example, the higher the activity level, of the metal oxide, the fester the reaction of the metal oxide with the other components of the Sorel cement, to form the hardened mass. The activity level of the metal oxide may vary based on a number of factors. For example, the particle size differential of the metal oxide particles may affect the activity level. A smaller particle size differential, may result in a higher activity level due, inter alia, to a greater surface area. Another factor that may affect the activity level of the metal oxide is a sintering process. By varying the heat applied during, and time of, the sintering process, metal oxide with varying activity levels may be provided. Metal oxide that has not been treated, by a sintering process may have a very high activity level, and thus it may be highly reactive in the Sorel cements. In an embodiment, a relatively more reactive metal oxide may be desired, such as where it may be desired to have a cement composition with a relatively short set time, for example, when desired to rapidly seal off a permeable zone. In an alternative embodiment, a relatively less reactive metal, oxide may be desired, for example, where a delay may be desired between, mixing the cement composition and the formation of a hardened mass.

A wide variety of soluble salts are suitable for use in the Sorel cement, including metal chlorides. In one embodiment, the Sorel cement comprises an alkaline earth metal chloride, such as magnesium chloride. An example of a suitable magnesium chloride is C-TEK additive, available from Halliburton Energy Services, Inc. In an alternative embodiment, the Sorel cement comprises magnesium sulfate or ammonium mono or dibasic phosphate.

In an embodiment, the Sorel cement may comprise the metal oxide and the soluble salt in a metal-oxide-to-soluble-salt ratio of about 3:1 to about 1:3. In another embodiment, the metal-oxide-to-soluble-salt ratio may range from about 2:1 to about 1:2. In yet another embodiment, the metal-oxide-to-soluble-salt ratio may range from about 1.5:1 to about 1:1.5. One of ordinary skill in the art will recognize the appropriate ratio of the metal oxide and soluble salt to include for a particular application.

Embodiments of the acid-soluble cement compositions generally may comprise CKD, which is a material generated in the manufacture of cement. CKD, as that term is used herein, refers to a partially calcined kiln feed which is removed from the gas stream and collected, for example, in a dust collector during the manufacture of cement. Usually, large quantities of CKD are collected in the production of cement that are commonly disposed of as waste. Disposal of the CKD as waste can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated, dust collection systems. CKD generally may comprise a variety of oxides, such as $SiO_2$, $Al_2O_3$, $Fe_2O_3$, CaO, MgO, $SO_3$, $Na_2O$, and $K_2O$. The term "CKD" is used herein to mean cement kiln dust made as described above and equivalent forms of cement kiln dust made in other ways.

The CKD generally may exhibit cementitious properties, in that it may set and harden in the presence of water. In accordance with embodiments of the present invention, the CKD may be used, among other things, to replace higher cost cementitious components, such as Portland cement and/or Sorel cement, resulting in more economical cement compositions. In addition, substitution of the CKD for the Portland and/or Sorel cement should result in a cement composition with a reduced carbon footprint.

The CKD may be included in the acid-soluble cement compositions in an amount sufficient to provide the desired compressive strength, density, cost reduction, and/or reduced carbon footprint. In some embodiments, the CKD may be present in the cement compositions of the present invention in an amount in the range of from about 1% to 100% by weight of cementitious components, for example, the CKD may be present in an amount of about 5%, about 10%, about 15%, about 20%, about 25%, about 30%, about 35%, about 40%, about 45%, about 50%, about 55%, about 60%, about 65%, about 70%, about 75%, about 80%, about 90%, or about 95%. In one embodiment, the CKD may be present in an amount in the range of from about 5% to about 99% by weight of cementitious components. In another embodiment, the CKD may be present in an amount in the range of from about 5% to about 80% by weight of cementitious components. In yet another embodiment, the CKD may be present in an amount in the range of from about 50% to about 80% by weight of cementitious components. One of ordinary skill in the art, with the benefit of this disclosure, will recognize the appropriate amount, of CKD to include for a chosen application.

While the preceding description describes CKD, the present invention is broad enough to encompass the use of other partially calcined kiln feeds that may be present in embodiments of the cement compositions of the present invention in an amount in a range of form about 1% to about 100% by weight of cementitious components. For example, embodiments of the acid-soluble cement compositions may comprise lime kiln dust, which, is a material that is generated during the manufacture of lime. The term "lime kiln dust" typically refers to a partially calcined kiln feed which can be removed from the gas stream and collected, for example, in a dust collector during the manufacture of lime. The chemical analysis of lime kiln, dust from, various lime manufactures varies depending on a number of factors, including the particular limestone or dolomitic limestone feed, the type of kiln, the mode of operation of the kiln, the efficiencies of the lime production operation, and the associated dust collection systems, lime kiln dust generally may comprise varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides.

Embodiments of the acid-soluble cement compositions may further comprise a natural pozzolan. Natural pozzolans are generally present on the Earth's surface and set and harden in the presence of hydrated lime and water. Examples of natural pozzolans include pumicite, diatomaceous earth, volcanic ash, opaline shale, tuff, and combinations thereof. Generally, pumicite is a volcanic rock that exhibits cementitious properties, in that it may set and harden in the presence of a source of calcium ions and water. Hydrated lime may be used in combination with the pumicite, for example, to provide sufficient calcium ions for the pumicite to set. The natural pozzolan may be used, among other things, to replace higher cost cementitious components, such as Portland or Sorel cement, in embodiments of the sealant compositions, resulting in more economical sealant compositions. In addition, substitution of the natural pozzolan for the Portland cement and/or Sorel cement should result in a cement composition with a reduced carbon footprint.

Where present, the natural pozzolan may be included in an amount sufficient to provide the desired compressive strength, density, cost reduction and/or reduced carbon footprint for a particular application. In some embodiments, the natural pozzolan may be present in the acid-soluble cement compositions of the present invention in an amount in the range of from about 1% to about 100% by weight of cementitious components. For example, the natural pozzolan may be present in an amount of about 5%, about 10%, about 15%, about 20%, about 25%, about 30%, about 35%, about 40%, about 45%, about 50%, about 55%, about 60%, about 65%, about 70%, about 75%, about 80%, about 90%, or about 95%. In one embodiment, the natural pozzolan may be present in an amount in the range of from about 5% to about 99% by weight of cementitious components, hi another embodiment, the natural pozzolan may be present in an amount in the range of from about 5% to about 80% by weight of cementitious components. In yet another embodiment, the natural pozzolan may be present in an amount in the range of from about 10% to about 50% by weight of cementitious components. In yet another embodiment, the natural pozzolan may be present in an amount in the range of from about 25% to about 50% by weight of cementitious components. One of ordinary skill in the art, with the benefit, of this disclosure, will recognize the appropriate amount of the natural pozzolan to include for a chosen application.

The water that may be used in embodiments of the cement compositions may include, for example, freshwater, saltwater (e.g., water containing one or more salts dissolved therein), brine (e.g., saturated, saltwater produced from subterranean formations), seawater, or combinations thereof. Generally, the water may be from any source, provided that the water does not contain an excess of compounds that may undesirably affect other components in the cement composition. In some embodiments, the water may be included in an amount, sufficient to form a pumpable slurry. In some embodiments, the water may be included in the cement compositions of the present invention in an amount in the range of about 40% to about 2.00% by weight of cementitious components. In some embodiments, the water may be included in an amount in the range of about 40% to about 150% by weight of cementitious components. One of ordinary skill in the art, with the benefit of this disclosure, will recognize the appropriate amount of water to include for a chosen application.

Embodiments of the cement compositions may further comprise a source of calcium ions, such as lime. In certain embodiments, the source of calcium ions may include hydrated lime. The source of calcium ions may be included in embodiments of the cement compositions, for example to, form a hydraulic composition with other components of the cement compositions, such as the pumice, fly ash, slag, and/or shale. Where present, the lime may be included in the cement compositions in an amount sufficient for a particular application. In some embodiments, the lime may be present in an amount in the range of from about 1% to about 40% by weight of cementitious components. For example, the lime may be present in an amount, of about 5%, about 10%, about 15%, about 20%, about 25%, about 30%, or about 35%. In one embodiment, the lime may be present in an amount in the range of from about 5% to about 20% by weight of cementitious components. One of ordinary skill in the art, with the benefit of this disclosure, will recognize the appropriate amount of the lime to include for a chosen application.

Embodiments of the acid-soluble cement compositions may further comprise an acid-soluble filler. The acid-soluble filler may be used, for example, in compositions that comprise Portland cement with the acid-soluble filler providing an acid-soluble component so that the compositions can be dissolved and removed. In an embodiment, the acid-soluble filler is present in a cement composition comprising a Sorel cement. Examples of suitable acid-soluble filler materials that are non-reactive with other components in the compositions, including without limitation dolomite, magnesium carbonate, calcium carbonate, and zinc carbonate. Where used, the acid-soluble filler may be present in the acid-soluble cement composition in an amount of from about 0.1% to about 300% by weight of the cementitious component. In an embodiment, the acid-soluble filler is present in an amount of from about 50% to about 400% by weight of the cementitious component. In an embodiment, the acid-soluble filler is present in an amount of from about 100% to about 300% by weight of the cementitious component. In alternative embodiments, the acid-soluble cement compositions may be free of the acid-soluble filler in that the acid-soluble cement compositions comprises the acid-soluble filler in an amount of about 0% by weight of the cementitious component. One of ordinary skill in the art, with the benefit of this disclosure, will recognize the appropriate amount of the acid-soluble filler to include for a chosen application.

Embodiments of the acid-soluble cement compositions may further comprise fly ash. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime so that, when mixed with water, it should set to form a hardened mass. Class F fly ash generally does not contain sufficient lime, so an additional source of calcium ions is required for the Class F fly ash to form a hydraulic composition. In some embodiments, lime may be mixed with Class F fly ash in an amount in the range of about 0.1% to about 25% by weight of the fly ash. In some instances, the lime may be hydrated lime. Suitable examples of fly ash include, but are not limited to, POZMIX® A cement additive, commercially available from Halliburton Energy Services, Inc., Duncan, Okla.

Where present, the fly ash generally may be included in the acid-soluble cement compositions in an amount sufficient to provide the desired compressive strength, density, and/or cost, in some embodiments, the fly ash may be present in the cement compositions of the present invention in an amount in the range of about 5% to about 75% by weight of cementitious components. In some embodiments, the fly ash may be present in an amount in the range of about 10% to about 60% by weight of cementitious components. One of ordinary skill in the art, with the benefit of this disclosure, will recognize the appropriate amount of the fly ash to include for a chosen application.

Embodiments of the acid-soluble cement compositions may further comprise a slag cement. In some embodiments, a slag cement that may be suitable for use may comprise slag. Slag generally does not contain sufficient basic material, so slag cement, may further comprise a base to produce a hydraulic composition that may react with water to set to form a hardened mass. Examples of suitable sources of bases include, but are not limited to, sodium, hydroxide, sodium bicarbonate, sodium carbonate, lime, and combinations thereof.

Where present, the slag cement generally may be included in the acid-soluble cement compositions in an amount sufficient to provide the desired compressive strength, density, and/or cost. In some embodiments, the slag cement may be present, in the cement, compositions of the present invention in an amount in the range of about 0.1% to about 99% by weight of cementitious components. In some embodiments, the slag cement may be present in an amount in the range of about 5% to about 75% by weight of cementitious components. One of ordinary skill in the art, with the benefit of this disclosure, will recognize the appropriate amount of the slag cement to include for a chosen application.

Embodiments of the acid-soluble cement compositions may further comprise metakaolin. Generally, metakaolin is a white pozzolan that may be prepared, by heating kaolin clay, for example, to temperatures in the range of about 600° C. to about 800° C. In some embodiments, the metakaolin may be present in the cement compositions of the present, invention in an amount in the range of about 5% to about 95% by weight of cementitious components. In some embodiments, the metakaolin may be present in an amount in the range of about 10% to about 50% by weight of cementitious components. One of ordinary skill in the art, with the benefit of this disclosure, will recognize the appropriate amount of the metakaolin to include for a chosen application.

Embodiments of the acid-soluble cement compositions may further comprise shale. Among other things, shale included in the cement compositions may react with excess lime to form a suitable cementing material, for example, calcium silicate hydrate. A variety of shales may be suitable, including those comprising silicon, aluminum, calcium, and/or magnesium. An example of a suitable shale comprises vitrified shale. Suitable examples of vitrified shale include, but are not limited to, PRESSUR-SEAL FINE LCM material and PRESSUR-SEAL COARSE LCM material which are commercially available from TXI Energy Services, Inc., Houston, Tex. Generally, the shale may have any particle size distribution as desired for a particular application. In certain embodiments, the shale may have a particle size distribution in the range of about 37 micrometers to about 4,750 micrometers.

Where present, the shale may be included in the acid-soluble cement compositions of the present invention in an amount sufficient to provide the desired compressive strength, density, and/or cost. In some embodiments, the shale may be present in the cement compositions of the present invention in an amount in the range of about 5% to about 75% by weight of cementitious components. In some embodiments, the shale may be present in an amount in the range of about 10% to about 35% by weight of cementitious components. One of ordinary skill in the art, with the benefit of this disclosure, will recognize the appropriate amount of the shale to include for a chosen application.

Embodiments of the acid-soluble cement compositions may further comprise zeolite. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. Examples of suitable zeolites are described in more detail in U.S. Pat. No. 7,445,669. An example of a suitable source of zeolite is available from the C2C Zeolite Corporation of Calgary, Canada. In some embodiments, the zeolite may be present in the cement compositions of the present invention, in an amount in the range of about 5% to about 65% by weight of cementitious components. In certain embodiments, the zeolite may be present in an amount in the range of about 10% to about 40% by weight of cementitious components. One of ordinary skill in the art, with the benefit of this disclosure, will recognize the appropriate amount of the zeolite to include for a chosen application.

Embodiments of the acid-soluble cement compositions may further comprise a set-retarding additive. As used herein, the term "set-retarding additive" refers to an additive that retards the setting of the acid-soluble cement compositions of the present invention. Examples of suitable set-retarding additives include, but are not limited to, ammonium, alkali metals, alkaline earth metals, metal salts of sulfoalkylated lignins, organic acids (e.g., hydroxycarboxy acids), copolymers that comprise acrylic acid or maleic acid, and combinations thereof. One example of a suitable sulfoalkylated lignin comprises a sulfomethylated lignin. Suitable set-retarding additives are disclosed in more detail in U.S. Pat. No. Re. 31,190, the entire disclosure of which is incorporated herein by reference. Suitable set-retarding additives are commercially available from Halliburton Energy Services, Inc. under the trademarks HR®-4, HR®-5, HR®-7, HR®-12, HR®-15, HR®-25, HR®-601, SCR™-100, and SCR™-500 retarders. Generally, where used, the set-retarding additive may be included in the cement compositions of the present invention in an amount sufficient to provide the desired set retardation. In some embodiments, the set-retarding additive may be present in the cement compositions of the present invention an amount in the range of about 0.1% to about 5% by weight of cementitious components. One of ordinary skill in the art, with the benefit of this disclosure, will recognize the appropriate amount of the set-retarding additive to include for a chosen application.

Optionally, other additional additives may be added to the acid-soluble cement compositions of the present invention as deemed appropriate by one skilled in the art, with the benefit of this disclosure. Examples of such additives include, but are not limited to, strength-retrogression additives, set accelerators, weighting agents, lightweight additives, gas-generating additives, mechanical-property-enhancing additives, lost-circulation, materials, filtration-control additives, dispersants, fluid-loss-control additives, defoaming agents, foaming agents, oil-swellable particles, water-swellable particles, thixotropic additives, and combinations thereof. Specific examples of these, and other, additives include crystalline silica, amorphous silica, fumed silica, salts, fibers, hydratable clays, microspheres, rice husk ash, elastomers, elastomeric particles, resins, latex, combinations thereof, and the like. A person having ordinary skill in the art, with the benefit of this disclosure, will readily be able to determine the type and amount of additive useful for a particular application and desired result.

The components of the acid-soluble cement compositions may be combined in any order desired to form an acid-soluble cement composition that can be placed into a subterranean formation. In addition, the components of the acid-soluble cement compositions may be combined using any mixing device compatible with the composition, including a bulk mixer, for example. In some embodiments, a dry blend may first be formed by dry blending dry components comprising, for example, CKD and/or hydraulic cement. The dry blend may then be combined with water to form the acid-soluble cement composition. Other suitable techniques may be used for preparation of the acid-soluble cement compositions as will be appreciated by those of ordinary skill in the art in accordance with embodiments of the present invention.

As will be appreciated by those of ordinary skill in the art, the acid-soluble cement compositions of the present invention may be used in subterranean operations in accordance with embodiments of the present invention. Without limitation, the cement composition may be used to seal off one or more subterranean zones from a well bore; to plug a void or crack in a conduit disposed in the well bore; to plug a void or crack in a cement, sheath disposed in the well bore; to plug an opening between the cement sheath and the conduit; to prevent the loss of fluid from the well bore into loss circulation zones such as a void, vug, or fracture; to form an annular plug; to isolate a gravel packed, interval of the well bore; or combinations thereof. In an embodiment, the acid-soluble cement composition may be used to form an acid-soluble barrier (e.g., a plug a seal, etc) in a subterranean formation. For example, the acid-soluble cement composition may be introduced into a well-bore annulus and allowed to set to form an acid-soluble cement, sheath.

An example of a method of the present invention comprises placing an acid-soluble cement composition in a subterranean formation, and allowing the acid-soluble cement composition to set in the formation. It is intended to be understood that the phrase "placing an acid-soluble cement composition in the subterranean formation" encompasses placement of the cement composition in the well bore and/or placement of the cement composition in rock surrounding the well bore with the well bore penetrating the subterranean formation, among others. The cement composition should form an acid-soluble hardened mass in the subterranean formation. The acid-soluble hardened mass can be left in the subterranean formation permanently or can be removed. Removal of the hardened mass may be desired so that the subterranean formation can be utilized in subsequent hydrocarbon production in accordance with embodiments of the present invention. In an embodiment, removal of the hardened mass includes contacting the hardened mass with an aqueous acid composition to at least partially dissolve the hardened mass. In some embodiments, the hardened mass may be completed removed. In other embodiments, the hardened mass may be partially removed. For example, the aqueous acid composition may contact the hardened mass to form through openings in the hardened mass to place the subterranean formation in communication with the interior of a pipe string, for example. The aqueous acid composition may include, for example, from about 7.5% to about 28% hydrochloric acid by weight of the composition. In an embodiment, the aqueous acid composition includes hydrochloric acid in an amount of about 15% by weight.

Another example of a method of the present invention comprises placing an acid-soluble cement composition in a well-bore annulus (e.g., an annulus between a pipe string disposed in a well bore and a wall of the well bore); and allowing the acid soluble cement composition to set. For example, the acid-soluble cement, composition may set in the well-bore annulus to form an acid-soluble cement sheath. The acid-soluble cement sheath can be left in the subterranean formation permanently or can be removed. Removal of the hardened mass may be desired so that the subterranean formation can be utilized in subsequent hydrocarbon production in accordance with embodiments of the present invention. In an embodiment, removal of the hardened mass includes contacting the hardened mass with an aqueous acid composition to at least partially dissolve the hardened mass. For example, the aqueous acid composition may contact the hardened mass to form through openings in the hardened mass to place the subterranean formation in communication with the interior of a pipe string, for example. In some embodiment, the aqueous acid composition may be placed into the well bore and allowed to contact the hardened mass through one or more openings in the pipe string.

To facilitate a better understanding of the present invention, the following examples of certain aspects of some embodiments are given. In no way should the following examples be read to limit or define, the scope of the invention.

EXAMPLE 1

A series of acid-soluble cement compositions was prepared at room temperature and subjected to crush strength and solubility testing. Each of the samples contained sufficient water to provide the density provided in the table below and comprised various quantities of Class H Portland cement, Holcim CKD, and/or calcium carbonate, as indicated in the table below.

Solubility Testing: For the solubility testing, each sample was poured into a 2-inch cube and allowed to cure in a water bath at 150° F. for either 48 hours (Samples 1-5) or 72 hours (Samples 6-10). After curing, the sample cubes are placed in an 80° F. water bath for at least 30 minutes and then weighed to determine an initial weight. Each sample cube was then submerged in 2,000 milliliters of a 15% by weight hydrochloric acid solution in a 3,000 milliliter beaker. The sample cube was supported in the acid solution above a magnetic stir bar. The magnetic stir bar was rotated to create a slight vortex on the surface of the acid solution. After 30 minutes, the sample cube was removed from the acid solution and weighed to determine a final weight. The acid solubility of each composition was calculated by the following formula:

Acid Solubility=(Initial Weight−Final Weight)/Initial Weight×100

Crush Strength Testing: For the crush strength testing, each sample was poured into a 2-inch cube, allowed to cure in a water bath at 150° C. for 48 hours (Samples 1-5) or 72 hours (Samples 6-10), and then crushed. The crush strengths were determined using a Tinius Olson tester in accordance with API Specification 10.

The results of the tests are set forth in the table below. In the following table, percent by weight is based on the weight of the cement and the CKD in the samples.

TABLE 1

Crush Strength Tests: Cement, CKD, and CaCO$_3$

| Sample | Density (ppg) | Portland Cement (% by wt) | CKD (% by wt) | CaCO$_3$ (% by wt) | Dissolution Time in 15% HCl (min) | Acid Solubility (%) | Crush Strength (psi) 48 Hr | 72 Hr |
|---|---|---|---|---|---|---|---|---|
| 1 | 15 | 75 | 25 | 100 | 30 | 82.72 | 736 | — |
| 2 | 15 | 50 | 50 | 100 | 30 | 99.01 | 523 | — |
| 3 | 15 | 25 | 75 | 100 | 30 | 99.88 | 353 | — |
| 4 | 15 | 0 | 100 | 100 | 30 | 99.25 | 67.2 | — |
| 5 | 15 | 100 | 0 | 100 | 30 | 66.46 | 1004 | — |
| 6 | 14.5 | 75 | 25 | 300 | 30 | 90.97 | — | 152 |
| 7 | 14.5 | 50 | 50 | 300 | 30 | 92.61 | — | 108 |
| 8 | 14.5 | 25 | 75 | 300 | 30 | 93.55 | — | 61 |
| 9 | 14.5 | 0 | 100 | 300 | 30 | 99.38 | — | 20 |
| 10 | 14.5 | 100 | 0 | 300 | 30 | 93.45 | — | 188 |

Example 1 thus indicates that acid-soluble cement compositions containing from 25% to 100% CKD by weight, from 0% to 75% Portland cement by weight, and from 100% to 300% calcium carbonate by weight may have properties suitable for use in acid-soluble operations.

EXAMPLE 2

An additional series of acid-soluble cement compositions was prepared and subjected to thickening time, force resistance, and theological tests. Each of the samples contained sufficient water to provide the density provided in the table below and comprised various quantities of Class H Portland cement, Holcim CKD, calcium carbonate, a dispersant (CFR™-3 cement friction reducer), and/or a set-retarding additive, as indicated in the table below. In the following tables, percent by weight is based on the weight of the cement and the CKD in the samples.

The samples were prepared at room temperature with thickening time tests conducted at 140° F. on a portion of each composition in accordance with API Specification 10. The crush strength of Sample 12 was determined by pouring the sample into a 2-inch cube, allowing it to cure in a water bath at 160° F. for 72 hours, and then crashing the cured cube. The crush strength was determined using a Tinius Olson tester in accordance with API Specification 10. The results of the thickening time and force resistance tests are provided in the table below.

carbonate by weight may have properties suitable for use in acid-soluble operations.

EXAMPLE 3

An additional acid-soluble cement composition was prepared to determine force resistance properties of compositions comprising pumicite. The composition contained sufficient water to provide the density provided in the table below and comprised Class H Portland cement, 200-mesh pumicite, calcium carbonate, a set-retarding additive (HR®-5 retarder), and hydrated lime, as indicated in the table below. For the acid

TABLE 2

Thickening Time Tests:
Cement, CKD, and CaCO₃

| Sample | Density (ppg) | Portland Cement (% by wt) | CKD (% by wt) | CaCO₃ (% by wt) | Dispersant (% by wt) | Retarder (% by wt) | Thickening Time to 70 bc (hr:min) | 72-Hr Crush Strength (psi) |
|---|---|---|---|---|---|---|---|---|
| 11 | 15 | 50 | 50 | 100 | — | 0.25% HR®-5 | 2:31 | — |
| 12 | 15 | 50 | 50 | 100 | — | 0.5% HR®-5 | 3:27 | 545 |
| 13 | 16 | 75 | 25 | 100 | 0.5 | 0.5% SCR-5™ | 1:41 | — |
| 14 | 16 | 75 | 25 | 100 | — | 1% HR®-12 | 8:42 | — |

For the theological tests, additional portions of the acid-soluble cement compositions were conditioned in an atmospheric consistometer to the test temperature. After conditioning, the theology of the compositions was determined using a Fann Model 35 viscometer at the temperature indicated in the table below using a bob and sleeve and spring #1 in accordance with the procedure set forth in API Specification 10. The results of the rheological tests are set forth in the table below. In the following table, percent by weight is based on the weight of the cement and the CKD in the samples.

solubility testing, the composition was poured into a 2-inch cube and cured at 180° F. for 24 hours. The acid solubility of the composition was then determined by submerging the cured cube in a 15% by weight hydrochloric acid solution in accordance with the procedure described above in Example 1. For the crush strength testing, the composition was poured into a 2-inch cube, allowed to cure in a water bath for 24 hours at 180° F., and then crushed. The 24-hour crush strength was determined using a Tinius Olson tester in accordance with API Specification 10. The results of the tests are set forth in

TABLE 3

Rheological Tests:
Cement, CKD, and CaCO₃

| Sample | Density (ppg) | Portland Cement (% by wt) | CKD (% by wt) | CaCO₃ (% by wt) | Dispersant (% by wt) | Retarder (% by wt) | Temp. (° F.) | Rotations Per Minute | | | | | | | |
|---|---|---|---|---|---|---|---|---|---|---|---|---|---|---|---|
| | | | | | | | | 600 | 300 | 200 | 100 | 60 | 30 | 6 | 3 |
| 12 | 15 | 50 | 50 | 100 | — | 0.5% HR®-5 | 80 | 76 | 41 | 30 | 18 | 14 | 9 | 6 | 5 |
| | | | | | | | 140 | 48 | 27 | 21 | 15 | 12 | 9 | 8 | 7 |
| 13 | 16 | 75 | 25 | 100 | 0.5 | 0.5% SCR-5™ | 80 | 167 | 79 | 54 | 27 | 16 | 8 | 2 | 2 |
| | | | | | | | 140 | 52 | 21 | 12 | 6 | 4 | 2 | 1 | 1 |
| 14 | 16 | 75 | 25 | 100 | — | 1% HR®-12 | 80 | 207 | 115 | 80 | 47 | 33 | 22 | 12 | 10 |
| | | | | | | | 140 | 98 | 47 | 32 | 18 | 12 | 8 | 4 | 4 |

Example 2 thus indicates that acid-soluble cement compositions containing from 25% to 50% CKD by weight, from 50% to 75% Portland cement by weight, and 100% calcium carbonate by weight may have properties suitable for use in acid-soluble operations.

the table below. In the following table, percent by weight is based on the weight of the cement and the CKD in the samples.

TABLE 4

Crush Strength Tests:
Cement, Pumicite, and $CaCO_3$

| Sample | Density (ppg) | Portland Cement (% by wt) | Pumicite (% by wt) | $CaCO_3$ (% by wt) | Retarder (% by wt) | Hydrated Lime (% by wt) | Dissolution Time in 15% HCl (min) | Acid Solubility (%) | 24-Hr Crush Strength (psi) |
|---|---|---|---|---|---|---|---|---|---|
| 15 | 15 | 50 | 50 | 100 | 0.5% HR ®-5 | 5 | 30 | 98.62 | 1400 |

Example 3 thus indicates that acid-soluble cement compositions containing Portland cement, pumicite, and calcium carbonate may have properties suitable for use in acid-soluble operations.

EXAMPLE 4

An additional series of acid-soluble cement compositions was prepared at room temperature to determine force resistance properties of compositions comprising Sorel cement (e.g., a mixture of magnesium chloride and magnesium oxide), CKD, and/or pumicite. Each of the samples contained water, magnesium chloride (C-TEK), magnesium oxide (THERMATEK™ LT additive), Holcim CKD, 200-mesh pumicite, and/or hydrated lime, as indicated in the table below. The crush strength of the compositions was determined by pouring each composition into a 2-inch cube, allowing the cube to cure in a water bath at 140° F. for either 24 or 48 hours, and then crushing the cured cube. The crush strengths were determined using a Tinius Olson tester in accordance with API Specification 10. The results of the tests are set forth in the table below.

TABLE 5

Crush Strength Test:
Sorel Cement, CKD, and/or Pumicite

| Sample | Water (g) | MgCl2 (g) | MgO (g) | CKD (g) | Pumicite (g) | Hydrated Lime (g) | Crush Strength (psi) 24 Hr | Crush Strength (psi) 72 Hr |
|---|---|---|---|---|---|---|---|---|
| 16 | 200 | 300 | 300 | — | — | — | 3460 | — |
| 17 | 200 | 300 | 285 | 15 | — | — | — | 2430 |
| 18 | 200 | 300 | 270 | 30 | — | — | — | 2280 |
| 19 | 200 | 300 | 225 | 75 | — | — | 1116 | — |
| 20 | 200 | 300 | 225 | 12.5 | 12.5 | 10 | — | 1822 |
| 21 | 200 | 300 | 300 | 75 | — | — | 1864 | — |
| 22 | 200 | 300 | 285 | — | 15 | — | 3080 | — |
| 23 | 200 | 300 | 270 | — | 30 | — | 2790 | — |
| 24 | 200 | 300 | 225 | — | 75 | — | 2360 | — |
| 25 | 200 | 300 | 225 | — | 75 | 7.5 | 2360 | — |

Example 4 thus indicates that acid-soluble cement compositions containing Sorel cement, cement kiln, dust, and/or pumicite may have properties suitable for use in acid-soluble operations.

EXAMPLE 5

An additional series of acid-soluble cement compositions was prepared at room temperature to determine force resistance properties of lightweight compositions comprising Sorel cement (e.g., a mixture of magnesium chloride and magnesium oxide) and CKD. Each of the samples contained water, magnesium chloride (C-TEK additive), magnesium oxide (THERMATEK™ LT additive), Holcim CKD, a set-retarding additive (R-TEK inhibitor), and glass bubbles (HGS 2000 glass bubbles), as indicated in the table below. he crush strength of the compositions was determined by pouring each composition into a 2-inch cube, allowing the cube to cure in a water bath at 140° F. for 24 hours, and then crushing the cured cube. The crush strengths were determined using a Tinius Olson tester in accordance with API Specification 10. The results of the tests are set forth in the table below.

TABLE 6

Crush Strength Tests: Sorel Cement and CKD

| Sample | Density (ppg) | Water (g) | MgCl2 (g) | MgO (g) | CKD (g) | Retarder (g) | Glass Bubbles (g) | 24-Hr Crush Strength (psi) |
|---|---|---|---|---|---|---|---|---|
| 26 | 11.23 | 200 | 300 | 300 | — | 18 | 50 | 923 |
| 27 | 10.84 | 200 | 300 | 225 | 75 | 18 | 50 | 663 |

Example 5 thus indicates that acid-soluble cement compositions having a lightweight and containing Sorel cement and cement kiln dust may have properties suitable for use in acid-soluble operations.

EXAMPLE 6

An additional series of acid-soluble cement compositions was prepared at room temperature and subjected to thickening time tests at 140° F. in accordance with API Specification 10. Each of the samples contained water, magnesium chloride (C-TEK additive), magnesium oxide (THERMATEK™ LT additive), Holcim CKD, and a retarder (R-TEK inhibitor) as indicated in the table below. The results of the tests are set forth in the table below.

TABLE 7

Thickening Time Tests: Sorel Cement and CKD

| Sample | Water (g) | MgCl2 (g) | MgO (g) | CKD (g) | Retarder (g) | Thickening Time to 70 bc (hr:min) |
|---|---|---|---|---|---|---|
| 28 | 200 | 300 | 225 | 75 | 5 | 00:36 |
| 29 | 200 | 300 | 225 | 75 | 9 | 1:13 |
| 30 | 200 | 300 | 225 | 75 | 18 | 1:11 |

Example 6 thus indicates that acid-soluble cement compositions containing Sorel cement and cement kiln dust may have properties suitable for use in acid-soluble operations.

EXAMPLE 7

An additional acid-soluble cement composition was prepared at room temperature and subjected to crush strength and solubility testing. This sample was prepared to test the solubility of an acid-soluble cement composition comprising CKD and free of any acid-soluble fillers. The sample comprised Holcim CKD (25% bwob), Texas Lehigh Class H Portland cement (25% bwob), fly ash (POZMIX® A cement additive, 25% bwob), bentonite (2.5% bwob), a set-retarding additive (HR®-800 retarder, 0.4% bwob), a fluid-loss-control additive (HALAD®-447, 0.25% bwob), a free-water-control additive (WG-17 EXP free-water control agent, 0.2% bwob), and fresh water (6.2 gal/sk). The abbreviation "% bwob" indicates the percent of the component by weight of a cement blend comprising the CKD, Portland cement, and fly ash. The abbreviation "gal/sk" indicates gallons per 89.5-pound sack of the cement blend. The sample had a density of 14 pounds per gallon.

Crush Strength Testing: For the crush strength, testing, a portion of the sample was poured into a 2-inch cube and allowed to cure in a water bath at 140° F. for 7 days. After curing, the sample cubes were placed in an 80° F. water bath for at least 30 minutes and then crushed. The crash strengths were determined using a Tinius Olson tester in accordance with API Specification 10. The determined crush strength was 2,200 psi.

Solubility Testing: For the solubility testing, a portion of the sample was poured into a 2-inch cube and allowed to cure in a water bath at 140° F. for 48 hours. After curing, the sample cubes were placed in an 80° F. water bath for at least 30 minutes and then weighed to determine an initial weight. Each sample cube was then submerged in 2,000 milliliters of a 15% by weight hydrochloric acid solution in a 3,000 milliliter beaker at ambient conditions. The sample cube was supported in the acid solution above a magnetic stir bar. The magnetic stir bar was rotated, to create a slight vortex on the surface of the acid solution. At specified intervals, the sample cube was removed from the acid solution and weighed to determine an interval weight. Weight loss of the cube was determined by subtracting the Interval weight from the initial weight. The sample cube was then returned to the acid solution. The acid solubility of each composition was calculated by the following formula:

Acid Solubility=Weight Loss/Initial Weight×100

After 2 hours, the testing was completed. The results of the solubility testing are set forth in the table below.

TABLE 8

Acid-Solubility Tests:
25% CKD, 50% Cement, and 25% Fly Ash in 15% HCL

| Interval Time (hr:min) | Interval Weight (gm) | Weight Loss (gm) | Acid Solubility (%) |
|---|---|---|---|
| 0:00 | 213.76 | 0 | 0 |
| 0:05 | 189.44 | 24.32 | 11.4 |
| 0:10 | 166.04 | 47.72 | 22.3 |
| 0:20 | 107.76 | 106.0 | 49.6 |
| 0:30 | 82.64 | 131.12 | 61.33 |
| 0:45 | 60.57 | 153.19 | 71.66 |
| 1:00 | 40.69 | 173.07 | 80.96 |
| 1:15 | 27.24 | 186.52 | 87.25 |
| 1:30 | 15.92 | 197.84 | 92.6 |
| 2:00 | 7.21 | 206.55 | 96.6 |

The solubility testing was repeated using a 7.5% by weight hydrochloric acid solution. The results of this test are set forth below.

TABLE 9

Acid-Solubility Tests:
25% CKD, 50% Cement, and 25% Fly Ash in 7.5% HCL

| Interval Time (hr:min) | Interval Weight (gm) | Weight Loss (gm) | Acid Solubility (%) |
|---|---|---|---|
| 0:00 | 202.73 | 0 | 0 |
| 0:05 | 185.08 | 17.65 | 8.71 |
| 0:10 | 172.11 | 30.62 | 15.10 |
| 0:20 | 147.54 | 55.19 | 27.22 |
| 0:30 | 115.68 | 87.05 | 42.93 |
| 0:45 | 92.85 | 109.88 | 54.20 |
| 1:00 | 85.65 | 117.08 | 57.75 |
| 1:15 | 79.86 | 122.87 | 60.60 |
| 1:30 | 75.66 | 127.07 | 62.68 |
| 2:00 | 71.03 | 131.70 | 64.96 |

Example 7 thus indicates that acid-soluble cement compositions containing CKD and free of an additional acid-soluble filler may have solubility properties suitable for use in acid-soluble operations.

EXAMPLE 8

An additional acid-soluble cement composition was prepared at room temperature and subjected to crush strength and solubility testing. This sample was prepared to further test the solubility of an acid-soluble cement composition comprising CKD and free of any acid-soluble fillers. The sample comprised Holcim CKD (100% bwob), calcium chloride (3% bwob), and fresh water (6.67 gal/sk). The abbreviation "% bwob" indicates the percent of the component by weight of a cement blend consisting of the CKD. The sample had a density of 13 pounds per gallon.

Crush Strength Testing: For the crush strength testing, a portion of the sample was poured into a 2-inch×4-inch cylinder and allowed to cure in a water bath at 170° F. for 24 hours. After curing, the sample cubes were placed in an 80° F. water bath for at least 30 minutes and then crashed. The crush strengths were determined using a Tinius Olson tester in accordance with API Specification 10. The determined crash strength was 345 psi.

Solubility Testing: For the solubility testing, a portion of the sample was poured into a 2-inch×4-inch cylinder and allowed to cure in a water bath at 140° F. for 24 hours. After curing, the sample cylinders were placed in an 80° F. water bath for at least 30 minutes and then weighed, to determine an initial weight. Each sample cylinder was then submerged in 2,000 milliliters of a 7.5% by weight, hydrochloric acid solution at 140° F. in a 3,000 milliliter beaker. The sample cylinder was supported in the acid solution above a magnetic stir bar. The magnetic stir bar was rotated to create a slight vortex on the surface of the acid solution. The sample cylinder was observed, and the time for complete dissolution of the sample cylinder was recorded. If not completely dissolved, the sample cylinder was removed from the acid solution after 2 hours and weighed to determine a final, weight. The acid solubility was then was calculated by the following formula:

Acid Solubility=(Initial Weight−Final Weight)/Initial Weight×100

The solubility testing was repeated using a 7.5% by weight hydrochloric acid solution and a 15% by weight hydrochloric acid solution. The results of the solubility testing are set forth in the table below.

TABLE 10

Acid-Solubility Tests: 100% CKD

| HCl Solution | Dissolution Time (hr:min) | Acid Solubility (%) |
|---|---|---|
| 3.0% | 2:00 | 8 |
| 7.5% | 1:45 | 100 |
| 15% | 0:12 | 100 |

Example 8 thus indicates that acid-soluble cement compositions containing CKD and free of an additional acid-soluble filler may have solubility properties suitable for use in acid-soluble operations.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit, is disclosed, any number and any included range falling within the range are specifically disclosed. In particular, every range of values (of the form, "from about a to about b," or, equivalently, "from approximately a to b," or, equivalently, "from approximately a-b") disclosed, herein is to be understood to set forth every number and range encompassed within the broader range of values even, if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual, embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within, the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of cementing comprising:
   providing an acid-soluble cement composition comprising a kiln dust and water, wherein the acid-soluble cement composition is free of any additional cementitious components other than the kiln dust;
   allowing the acid-soluble cement composition to set to form an acid-soluble hardened mass; and
   contacting the acid-soluble hardened mass with an acid.

2. The method of claim 1 wherein the acid-soluble cement composition has a density of about 8 pounds per gallon to about 16 pounds per gallon.

3. The method of claim 1 wherein the kiln dust comprises cement kiln dust.

4. The method of claim 1 wherein the kiln dust comprises lime kiln dust.

5. The method of claim 1 wherein the kiln dust comprises cement kiln dust present in an amount in a range of from about 1% to 100% by weight of a total amount of cementitious components present in the acid-soluble cement composition.

6. The method of claim 1 wherein the kiln dust comprises cement kiln dust present in an amount in a range of from about 50% to about 100% by weight of a total amount of cementitious components present in the acid-soluble cement composition.

7. The method of claim 1 wherein the acid-soluble cement composition is free of an acid-soluble filler.

8. The method of claim 1 wherein the acid-soluble cement composition is free of an acid-soluble filler selected from the group consisting of dolomite, magnesium carbonate, calcium carbonate, zinc carbonate, and any combination thereof.

9. The method of claim 1 wherein the acid-soluble cement composition further comprises an additive selected from the group consisting of metakaolin, crystalline silica, amorphous silica, fumed silica, salt, fiber, hydratable clay, microsphere, rice husk ash, an elastomer, an elastomeric particle, a resin, a latex, and any combination thereof.

10. The method of claim 1 wherein the acid-soluble cement composition further comprises an additive selected from the group consisting of a set-retarding additive, a strength-retrogression additive, a set accelerator, a weighting agent, a lightweight additive, a gas-generating additive, a mechanical-property-enhancing additive, a lost-circulation material, a filtration-control additive, a dispersant, a fluid-loss-control additive, a defoaming agent, a foaming agent, an oil-swellable particle, a water-swellable particle, a thixotropic additive, and any combination thereof.

11. The method of claim 1 wherein contacting the acid-soluble hardened mass with an acid comprises contacting the acid-soluble hardened mass with an aqueous acid composition, wherein the aqueous acid composition comprises hydrochloric acid present in the aqueous acid composition in an amount of about 7.5% to about 28% by weight of the aqueous acid composition.

12. The method of claim 1 further comprising: placing the acid-soluble cement composition into a subterranean formation.

13. The method of claim 12 wherein the acid-soluble cement composition is allowed to set in a well-bore annulus in the subterranean formation, wherein the acid contacts the acid-soluble hardened mass through one or more openings in a pipe string disposed in the subterranean formation.

14. The method of claim 1 wherein the acid-soluble cement composition further comprises an acid-soluble filler.

15. A method of cementing comprising:
    placing an acid-soluble cement composition in a subterranean formation, the acid-soluble cement composition comprising:
       cement kiln dust in an amount of 100% by weight of a total amount of cementitious components in the acid-soluble cement composition; and
       water;
    allowing the acid-soluble cement composition to set to form an acid-soluble hardened mass; and
    contacting the acid-soluble hardened mass with an acid.

16. The method of claim 15 wherein the acid-soluble cement composition is free of an acid-soluble filler.

17. The method of claim 15 wherein the acid-soluble cement composition is free of an acid-soluble filler selected from the group consisting of dolomite, magnesium carbonate, calcium carbonate, zinc carbonate, and any combination thereof.

18. The method of claim 15 wherein the acid-soluble cement composition further comprises an additive selected from the group consisting of a set-retarding additive, a strength-retrogression additive, a set accelerator, a weighting agent, a lightweight additive, a gas-generating additive, a mechanical-property-enhancing additive, a lost-circulation material, a filtration-control additive, a dispersant, a fluid-loss-control additive, a defoaming agent, a foaming agent, an oil-swellable particle, a water-swellable particle, a thixotropic additive, and any combination thereof.

19. The method of claim 15 wherein contacting the acid-soluble hardened mass with an acid comprises contacting the acid-soluble hardened mass with an aqueous acid composition, wherein the aqueous acid composition comprises hydrochloric acid present in the aqueous acid composition in an amount of about 7.5% to about 28% by weight of the aqueous acid composition.

20. The method of claim 15 wherein the placing the acid-soluble composition comprises placing the acid-soluble composition in a well-bore annulus between a pipe string disposed in the subterranean formation and a wall of a well bore.

21. The method of claim 15 wherein the acid-soluble cement composition is allowed to set in a well-bore annulus in the subterranean formation, wherein the acid contacts the acid-soluble hardened mass through one or more openings in a pipe string disposed in the subterranean formation.

22. The method of claim 15 wherein the acid-soluble cement composition further comprises an acid-soluble filler.

23. A method of cementing comprising:
    placing an acid-soluble cement composition in a subterranean formation, the acid-soluble cement composition comprising cement kiln dust and water, wherein the acid-soluble cement composition is free of any acid-soluble fillers;
    allowing the acid-soluble cement composition to set to form an acid-soluble hardened mass; and
    contacting the acid-soluble hardened mass with an acid.

24. The method of claim 23 wherein the acid-soluble cement composition further comprises a hydraulic cement selected from the group consisting of a Portland cement, a pozzolana cement, a gypsum cement, a high alumina content cement, a slag cement, a silica cement, and any combination thereof.

25. The method of claim 23 wherein the cement kiln dust is present in an amount in a range of from about 1% to 100% by weight of a total amount of cementitious components present in the acid-soluble cement composition.

26. The method of claim 23 wherein the cement kiln dust is present in an amount of about 100% by weight of a total amount of cementitious components present in the acid-soluble cement composition.

27. The method of claim 23 wherein the acid-soluble cement composition is free of any additional cementitious components other than the cement kiln dust.

28. The method of claim 23 wherein the acid-soluble cement composition further comprises an additive selected from the group consisting of a fly ash, a slag cement, metakaolin, shale, zeolite, crystalline silica, amorphous silica, fumed silica, salt, fiber, hydratable clay, microsphere, rice husk ash, an elastomer, an elastomeric particle, a resin, a latex, and any combination thereof.

29. The method of claim 23 wherein the acid-soluble cement composition further comprises an additive selected from the group consisting of a set-retarding additive, a strength-retrogression additive, a set accelerator, a weighting agent, a lightweight additive, a gas-generating additive, a mechanical-property-enhancing additive, a lost-circulation material, a filtration-control additive, a dispersant, a fluid-loss-control additive, a defoaming agent, a foaming agent, an oil-swellable particle, a water-swellable particle, a thixotropic additive, and any combination thereof.

30. The method of claim 23 wherein contacting the acid-soluble hardened mass with an acid comprises contacting the acid-soluble hardened mass with an aqueous acid composition, wherein the aqueous acid composition comprises hydrochloric acid present in the aqueous acid composition in an amount of about 7.5% to about 28% by weight of the aqueous acid composition.

31. The method of claim 23 wherein the acid-soluble cement composition is allowed to set in a well-bore annulus in the subterranean formation, wherein the acid contacts the acid-soluble hardened mass through one or more openings in a pipe string disposed in the subterranean formation.

* * * * *